United States Patent
Worley

(10) Patent No.: US 9,956,978 B1
(45) Date of Patent: May 1, 2018

(54) INSULATED COOLER CADDY

(71) Applicant: Andrea M. Worley, Castalia, NC (US)

(72) Inventor: Andrea M. Worley, Castalia, NC (US)

( * ) Notice: Subject to any disclaimer, the term of this patent is extended or adjusted under 35 U.S.C. 154(b) by 0 days. days.

(21) Appl. No.: 15/711,575

(22) Filed: Sep. 21, 2017

(51) Int. Cl.
| | |
|---|---|
| B62B 13/18 | (2006.01) |
| B62B 1/18 | (2006.01) |
| B62B 3/02 | (2006.01) |
| B62B 3/10 | (2006.01) |
| B62B 5/06 | (2006.01) |

(52) U.S. Cl.
CPC ............ B62B 3/02 (2013.01); B62B 3/10 (2013.01); B62B 5/06 (2013.01)

(58) Field of Classification Search
CPC ........ B62B 2202/52; B62B 13/18; B62B 1/18
See application file for complete search history.

(56) References Cited

U.S. PATENT DOCUMENTS

| | | | |
|---|---|---|---|
| 4,863,075 A * | 9/1989 | Romer | A45F 3/46 108/19 |
| 5,080,387 A | 1/1992 | Ryals | |
| 5,306,029 A | 4/1994 | Kaiser, II | |
| 5,911,422 A * | 6/1999 | Carpenter | B62B 3/007 280/10 |
| 6,109,644 A | 8/2000 | Cox | |
| 6,783,147 B1 | 8/2004 | Green, Sr. | |
| 7,441,783 B2 | 10/2008 | Clark et al. | |
| 8,069,939 B1 | 12/2011 | Metzler | |
| 2002/0125668 A1 * | 9/2002 | Sims | B62B 1/18 280/47.26 |
| 2006/0237928 A1 | 10/2006 | Vanderberg et al. | |
| 2007/0296167 A1 * | 12/2007 | Beswick | B62B 15/008 280/47.34 |
| 2009/0026735 A1 | 1/2009 | Watzke | |

* cited by examiner

Primary Examiner — Bryan A Evans
(74) Attorney, Agent, or Firm — Aaron R. Cramer; Cramer Patent & Design, PLLC

(57) ABSTRACT

An insulated caddy includes a tray disposed above a frame with a wheel secured beneath each corner of the frame. A plurality of accessory rails is disposed about the exterior sides of the frame. An adjustable shelf is secured to the handle. A metallic rack is secured in the back of the tray and is perpendicular to the tray bottom. A plurality of hooks is disposed adjacent the top edge of the tray. A mesh bag with a fastener is centered within the metallic rack.

19 Claims, 4 Drawing Sheets

INSULATED COOLER CADDY

RELATED APPLICATIONS

Not applicable.

FIELD OF THE INVENTION

The present invention relates generally to a caddy for transporting an insulated cooler.

BACKGROUND OF THE INVENTION

Very few leisure time activities rival that of spending a warm summer day near a body of water. Whether on the water at an ocean or a small lake, or even on a beach or dock, the feeling that comes with being outside and near water is enjoyable. Most people usually bring a large assortment of supporting items with them such as coolers, drink, fishing poles, towels, books, and the like. All of these items must be transported from their cars or homes to the water itself. This often dictates many repeat trips when arriving at the outdoor location and an equal number of trips when leaving. Many people have also utilized wagons to aid in this effort, but when the wheels hit the loose sand, they sink into the surface, thus making the effort of pulling the wagon extremely difficult if not impossible.

Accordingly, there exists a need for a means by which items can be transported across a rough or sandy surface with ease and without the inconveniences as mentioned above. The development of the transport device for food cooler and associated items fulfills this need.

SUMMARY OF THE INVENTION

The inventor has recognized the aforementioned, inherent problems and lack in the art and observed that there is a need for a caddy having multiple features that is capable of transporting an insulated cooler, no matter the size, shape, make, or model, which will be described in greater detail herein, fulfills this need.

It is therefore an object of the invention to provide such a caddy that incorporates a folding frame, including a planar frame base with a fore side, a rear side, a first side, and a second side, and a handle assembly affixed to the frame base rear side. A plurality of folding points is affixed to a bottom surface of said frame base, and each are in mechanical communication with a releasing means. The releasing means enables one to selectively manipulate the plurality of folding points between a secure configuration, where the caddy is deployed, and a folded configuration, where the caddy is folded. A sliding base assembly with a stop is slidably disposed on the frame base, adjacent the rear side, and has an upper surface coextensive with an upper surface of the frame base. A plurality of wheel assemblies is affixed to the bottom surface of the folding frame.

It is an object to also provide for a lip on the frame base that projects perpendicularly upward from the folding frame upper surface at a front perimeter edge and coextensive therewith, at a portion of a first side, and at a portion of a second side. In this configuration, the lip arrests forward movement of the stop. In at least one (1) embodiment, the lip and the stop is approximately four to five inches (4-5 in.) in height.

It is a further object to provide such a handle assembly to include a pair of handle posts, each having a first end affixed to the frame base, a rear handle attached to and spanning a distance between a second end of each of the pair of handle posts, a bottle opener affixed to one (1) of the pair of handle posts, at least one (1) hook affixed to a support bar between said pair of handle posts, and at least one (1) container holder affixed to the rear handle. The rear handle further incorporates the releasing means.

It is another object of the caddy to provide at least two (2) shelf assemblies, each pivotally attached between the handle posts. Each shelf assembly further includes a plurality of clips disposed thereon. At least one (1) mesh bag with a securable opening is affixed to an individual shelf assembly.

It is yet another object of the caddy to provide at least one (1) auxiliary mounting device, including a mounting rail capable of being attached to the frame base, an outer channel slidably disposed over the mounting rail, a spring fastener securing the outer channel to the mounting rail, and a holding peripheral affixed to the outer channel. The holding peripheral is configured to retain an item therein.

BRIEF DESCRIPTION OF THE DRAWINGS

The advantages and features of the embodiments and examples disclosed herein will become better understood with reference to the following more detailed description and claims taken in conjunction with the accompanying drawings, in which like elements are identified with like symbols, and in which:

Figure 1:
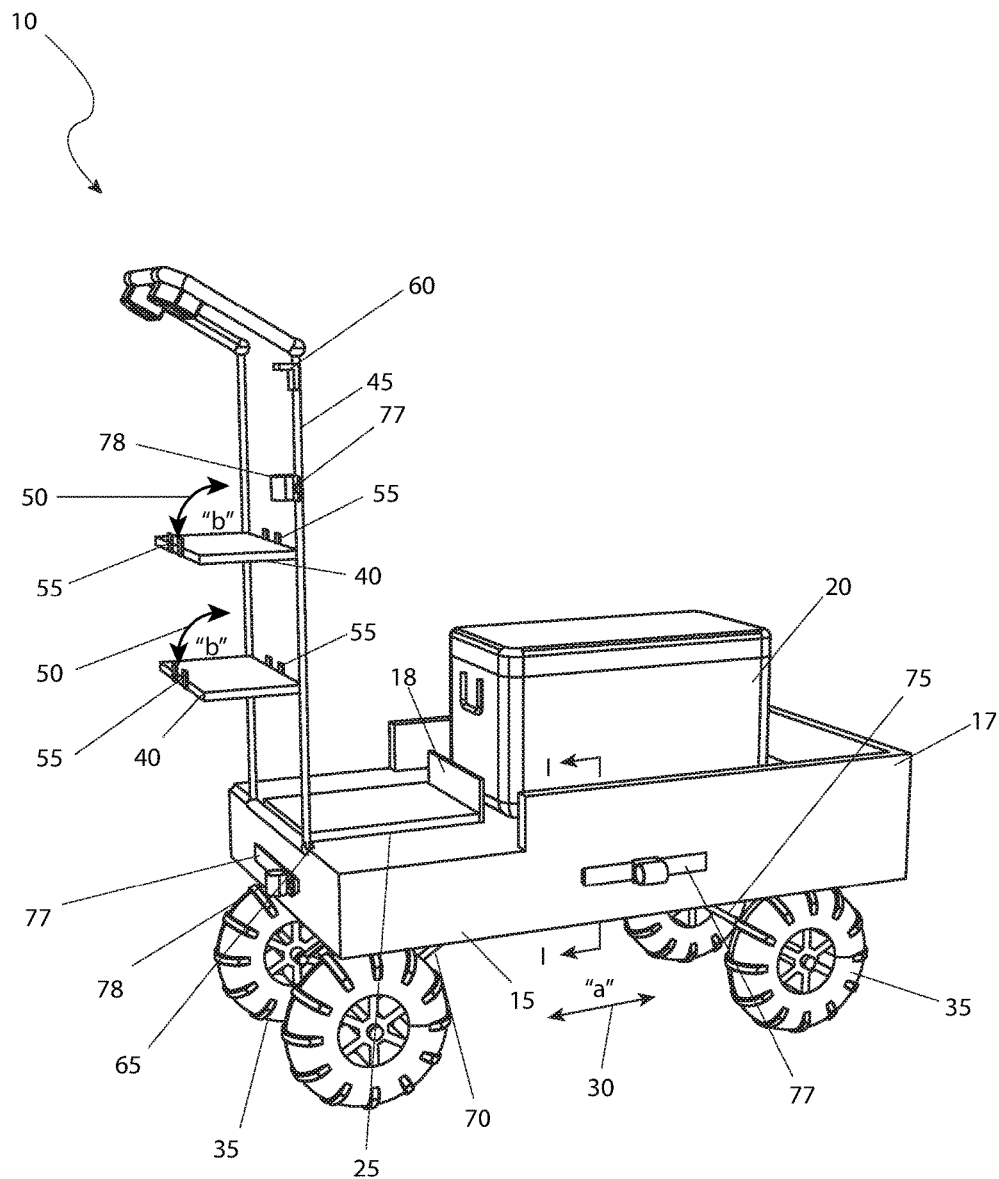
FIG. 1 is a side view of the transport device 10, according to the preferred embodiment of the present invention.

DESCRIPTIVE KEY 10 transport device
15 folding frame
17 lip
18 stop
20 food cooler
25 lower sliding base
30 travel path "a"
35 large aggressive tread wheel
40 folding shelf
45 handle post
50 travel path "b"
55 connection clip
60 bottle opener
65 folding point "1"
70 folding point "2"
75 folding point "3"
77 mounting access rail
78 holding peripheral (fishing pole holder)
80 mesh fabric storage bag
85 fastener
90 zipper
95 hook
100 push handle assembly
105 cup holder
110 twist release collar
115 push-to-release pushbutton
120 outer channel 125 spring fastener
130 holding peripheral
135 standoff

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

Referring now to FIG. 1, a side view of the transport device 10, according to the preferred embodiment of the present invention is disclosed. The transport device 10 (herein also described as the "device") 10, comprises primarily of a folding frame 15 used to hold and transport a items 20, such as a food cooler. The folding frame 15 is universal in design and is capable of handling a wide variety of makes and models of various food cooler 20, in any orientation. The folding frame has a lip 17, preferably about four to five inches (4-5 in.) upstanding from a majority of the perimeter upper edge of the folding frame 15 to retain the items 20 or any spills therein. Preferably, the lip 17 projects from the first side, the opposing second side, and the front side of the folding frame 15. As such, the present invention is not limited to use with an included or specific item 20, such as any specific food cooler brand and size.

A lower sliding base 25 moves back and forth along a travel path "a" 30 to secure the item 20 in place via friction fit. The lower sliding base 25 has a stop 18 that provides the remaining rear side of the upstanding lip 17. The stop 18 is preferably the same height as the lip 17. The folding frame 15 is provided with four (4) large aggressive tread wheels 35 (only which two (2) are shown due to illustrative limitations). The profile and outer surface of the large aggressive tread wheels 35 allow for easy movement over all types of grade such as grass, gravel, pavement, sand, snow or the like without the tendency to sink into the grade.

A handle assembly includes a pair of handle posts 45, each affixed to the rear of the folding frame 15 and project upwardly therefrom. A push handle 100 is affixed to and spans the distance between the opposing distal ends of the pair of handle posts 45. At least two (2) folding shelves 40 are pivotally attached between the handle posts 45. The folding shelves 40 fold upward along a travel path "b" 50 as shown. Each folding shelf 40 is provided with a series of connection clips 55 to aid in the retention of items such as tackle boxes, radios, purses, diaper bags, and the like. A bottle opener 60 is permanently affixed near the upper area of one (1) of the handle posts 45 to aid in the opening of beverage bottles. Due to its inability to be removed, it is always easy to find and reduces aggravation when attempting locate a bottle opener.

The folding frame 15 is disengaged at three (3) folding points: a folding point "1" 65, a folding point "2" 70, and a folding point "3" 75. Said folding points are duplicated in a mirrored fashion on the opposite side of the folding frame 15 for a total of six (6) folding points. Said folding points 65, 70, 75 can be released by a wide variety of methods, including but not limited to: locking levers, pin and spring fasteners, threaded friction locking collars, or quick release fasteners. The specific inclusion or exclusion of any one (1) type of folding point is not intended to be a limiting factor of the present invention. Once all items, including the food cooler 20 are removed, and the folding points 65, 70, 75 disengaged, the device 10 can be folded up into a compact position (much like a folding baby stroller) for storage or transport in a motor vehicle. When need again, the folding frame 15 can be quickly deployed for continued use in a manner of seconds. A series of mounting access rails 77 are provided at various points along the device 10. These mounting access rails 77 are used for mounting peripherals as desired by the user per the particular task the device 10 is being used for. One (1) particular peripheral is a holding peripheral (fishing pole holder) 78 used to hold fishing poles in an upright position for transport. Other peripherals, beyond the scope of this disclosure may also be utilized with the mounting access rail 77, such as cellular phone holders, entertainment system holders, and the like, and as such, should not be interpreted as a limiting factor of the present invention.

Figure 2:
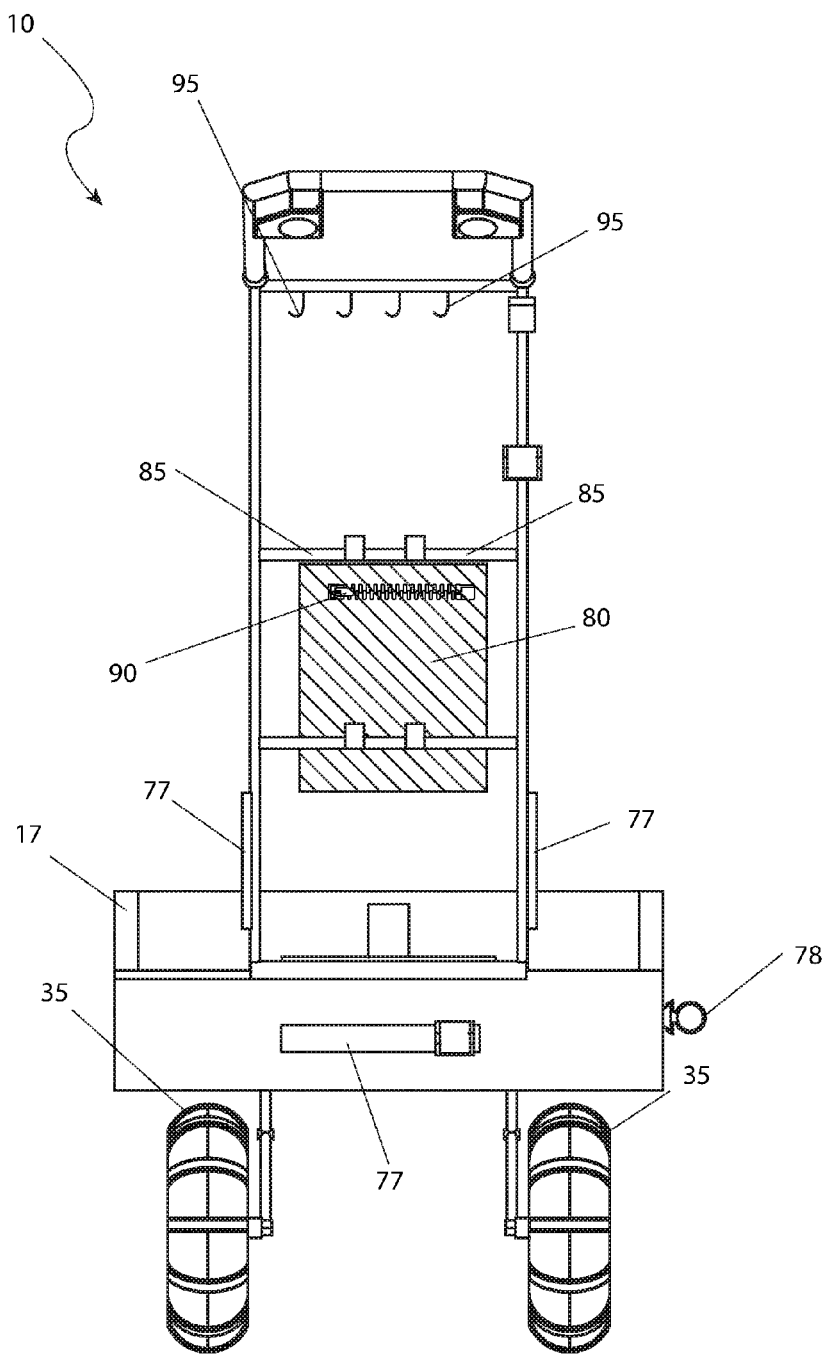
FIG. 2 is a front view of the transport device 10, according to the preferred embodiment of the present invention.

Referring next to FIG. 2, a front view of the device 10, according to the preferred embodiment of the present invention is depicted. This figure is shown with the food cooler 20 (as shown in FIG. 1) removed for purposes of clarity. A mesh fabric storage bag 80 is shown as supported from the front edge of the uppermost folding shelves 40 and is secured via fasteners 85 such as snaps or clips. The opening of the mesh fabric storage bag 80 is secured via a zipper 90 through which items placed inside the mesh fabric storage bag 80 can be placed and/or removed. Items envisioned to be stored inside the mesh fabric storage bag 80 include but are not limited to; trash, beach towels, clothing, items to be recycled, or the like. A series of at least four (4) hanging hooks 95 are provided from the underside of the upper portion of the handle posts 45 along a support bar. The hanging hooks 95 would be used to hold items including but not limited to: keys, towels, lightweight articles of clothing, or the like. Additional mounting access rail 77 are also disclosed.

Figure 3:
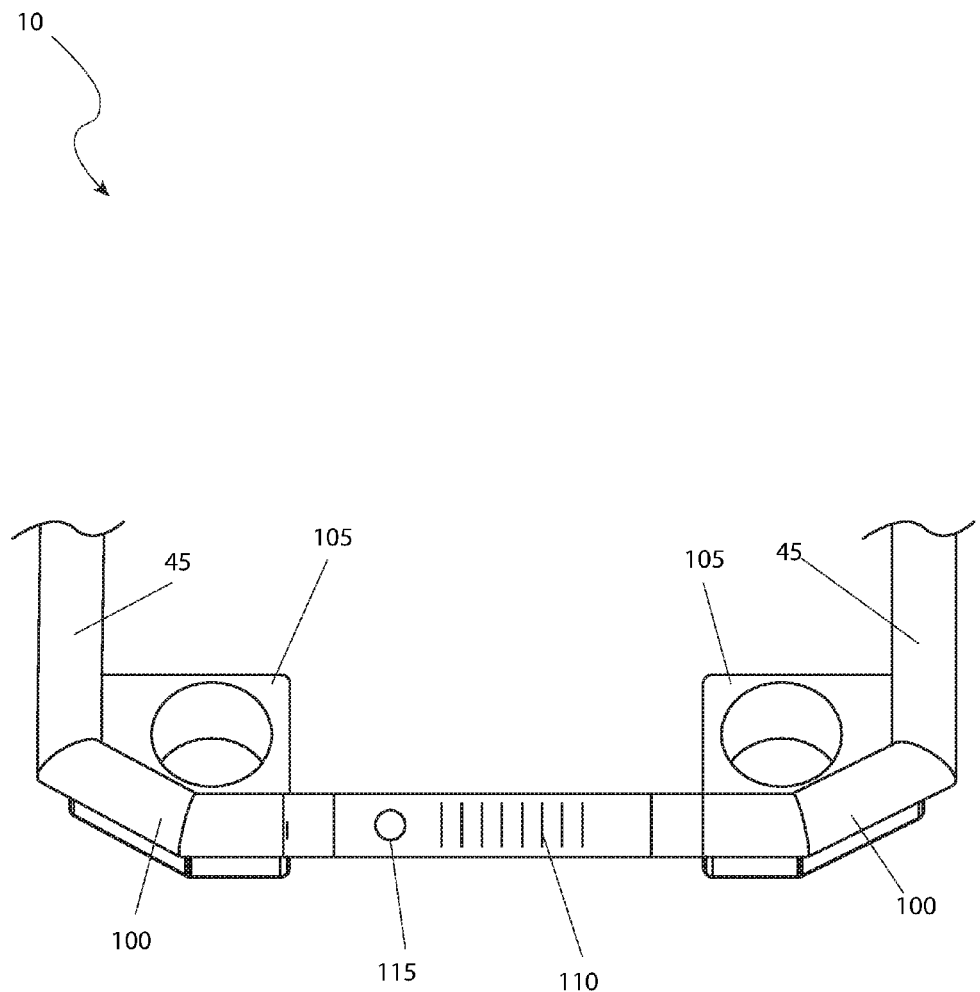
FIG. 3 is a partial top view of the transport device 10, according to the preferred embodiment of the present invention; and, FIG. 4 is a sectional view of the transport device 10, as seen along a line I-I, as shown in FIG. 1, according to the preferred embodiment of the present invention.

Referring now to FIG. 3, a partial top view of the device 10, according to the preferred embodiment of the present invention is shown. This figure discloses a push handle assembly 100 located atop the handle posts 45. A series of cup holders 105 are provided for the temporary placement of beverage containers. The center of the push handle assembly 100 provides a twist release collar 110 that allows for remote engagement of the folding point "1" 65 (as shown in FIG. 1), the folding point "2" 70 (as shown in FIG. 1), and the folding point "3" 75 (as shown in FIG. 1). Upon twisting the twist release collar 110 (in much the same manner as a handlebar mounted throttle assembly on a motorcycle), the aforementioned folding points 65, 70, 75 disengage by the use of internal components such as cable/sleeve assemblies, direct linkages, electrically operated solenoids, sliding rails, or the like. The particular inclusion or exclusion of any particular type of internal component is not intended to be a limiting factor of the present invention. To prevent inadvertent operation of the twist release collar 110, such as while simply pushing the device 10, a push-to-release pushbutton 115 is provided which must be pushed (such as by the user's thumb) simultaneously while twisting the twist release collar 110.

Figure 4:
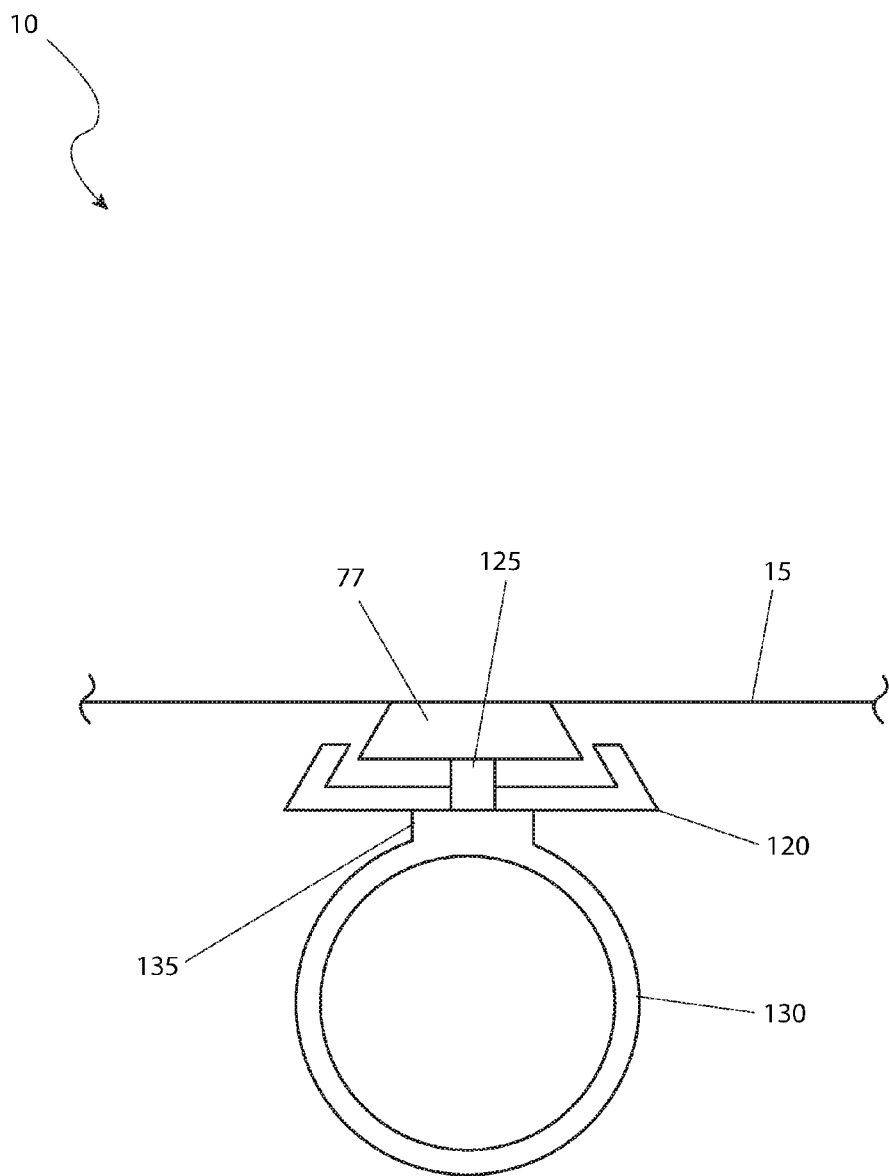

Referring finally to FIG. 4, a sectional view of the device 10, as seen along a line I-I, as shown in FIG. 1, according to the preferred embodiment of the present invention is disclosed. The mounting access rail 77 is mounted on the device 10 at various points on the folding frame 15 in an effort to provide customization of the transport abilities. For example, the items needed when going to a favorite fishing spot may be different from the items needed for a trip to a beach or even a backyard barbeque. The mounting access rail 77 allows the user to carry auxiliary or specialty items. An outer channel 120 slides over the mounting access rail 77 and is held in place by a spring fastener 125 such as a spring clip, a push-to-release clip, a détente clip, or the like. The use or omission of any particular style of spring fastener 125 is not intended to be a limiting factor of the present invention. A holding peripheral 130 is permanently attached to each specific outer channel 120 via a standoff 135. The holding peripheral 130 may include but not be limited to such items as fishing rod holders (as depicted in FIG. 4), cellular phone holders, entertainment system holders, and the like, as aforementioned described. In such a manner, the user may simply slide on and off various holding peripheral 130 to suit the specific task at hand being imposed upon the device 10.

The preferred embodiment of the present invention can be utilized by the common user in a simple and effortless manner with little or no training. It is envisioned that the device 10 would be constructed in general accordance with FIG. 1 through FIG. 4. The user would procure the device 10 and also have available a food cooler 20 procured through previous or simultaneous acquisitions.

After procurement and prior to utilization, the device 10 would be prepared in the following manner: the user would unfold (deploy) the device 10, place the food cooler 20 upon the lower sliding base 25, adjust the lower sliding base 25 along the travel path "a" 30, attach desired holding peripheral 130 to appropriate mounting access rail 77, add any desired personal items such as beverage cups, towels, tackle boxes, communication devices, entertainment devices, fishing poles, and the like. At this point in time, the device 10 is ready to be utilized by pushing it by the push handle assembly 100 on the large aggressive tread wheels 35 over various grade conditions.

After use of the device 10, it is readied for storage in the following manner: all personal items are removed from the device 10, the food cooler 20 is removed, any holding peripherals 130 are removed by pressing the spring fastener 125 and sliding the outer channel 120 over and off of the mounting access rail 77. Next, the push-to-release pushbutton 115 is pressed while rotating the twist release collar 110 which in turn releases the folding point "1" 65, the folding point "2" 70 and the folding point "3" 75 allowing the folding frame 15 to collapse. These actions permit the device 10 to occupy a small footprint during storage. When needed again, the utilization process described above is repeated, thus allowing for continuous use of the device 10 in a repeated and cyclical manner.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. A caddy, comprising:
    a folding frame, including:
        a planar frame base, comprising a fore side, a rear side, a first side, and a second side; and,
        a handle assembly affixed to said frame base rear side;
        a plurality of folding points affixed to a bottom surface of said frame base; and,
        a releasing means for selectively manipulating said plurality of folding points between a secure configuration, where said caddy is deployed, and a folded configuration, where said caddy is folded, said releasing means in mechanical communication with each said plurality of folding points;
    a sliding base assembly slidably disposed on said frame base, adjacent said rear side, and having an upper surface coextensive with an upper surface of said frame base, further having a stop located at a fore location thereof; and,
    a plurality of wheel assemblies, each affixed to said bottom surface of said folding frame;
    wherein said base frame is capable of supporting an insulated cooler thereon.

2. The caddy of claim 1, wherein said frame base further has a lip projecting perpendicularly upward from said folding frame upper surface at a perimeter edge along said fore side and coextensive therewith, at a perimeter edge along a portion of said first side, and at a perimeter edge along a portion of said second side;
    wherein said lip arrests forward movement of said stop.

3. The caddy of claim 2, wherein said lip is approximately four to five inches in height.

4. The caddy of claim 3, wherein said stop is approximately four to five inches in height.

5. The caddy of claim 1, wherein each of said plurality of wheels incorporates a large aggressive tread.

6. The caddy of claim 1, wherein said handle assembly further comprises:
    a pair of handle posts, each having a first end affixed to said frame base;
    a rear handle attached to and spanning a distance between a second end of each said pair of handle posts;
    a bottle opener affixed to one of said pair of handle posts;
    at least one hook affixed to a support bar between said pair of handle posts; and,
    at least one container holder affixed to said rear handle;
    wherein said rear handle further incorporates said releasing means.

7. The caddy of claim 6, further comprising at least two shelf assemblies, each pivotally attached between said handle posts.

8. The caddy of claim 7, wherein each shelf assembly further comprises a plurality of clips disposed thereon.

9. The caddy of claim 8, further comprising at least one mesh bag with a securable opening, each affixed to an individual shelf assembly.

10. A caddy, comprising:
    a folding frame, including:
        a planar frame base, comprising a fore side, a rear side, a first side, and a second side; and,
        a handle assembly affixed to said frame base rear side;

at least one auxiliary mounting device affixed to a side surface of said frame base;

a plurality of folding points affixed to a bottom surface of said frame base; and, a releasing means for selectively manipulating said plurality of folding points between a secure configuration, where said caddy is deployed, and a folded configuration, where said caddy is folded, said releasing means in mechanical communication with each said plurality of folding points;

a sliding base assembly slidably disposed on said frame base, adjacent said rear side, and having an upper surface coextensive with an upper surface of said frame base, further having a stop located at a fore location thereof; and, a plurality of wheel assemblies, each affixed to said bottom surface of said folding frame;

wherein said base frame is capable of supporting an insulated cooler thereon.

11. The caddy of claim 10, wherein said frame base further has a lip projecting perpendicularly upward from said folding frame upper surface at a perimeter edge along said fore side and coextensive therewith, at a perimeter edge along a portion of said first side, and at a perimeter edge along a portion of said second side;

wherein said lip arrests forward movement of said stop.

12. The caddy of claim 11, wherein said lip is approximately four to five inches in height.

13. The caddy of claim 12, wherein said stop is approximately four to five inches in height.

14. The caddy of claim 10, wherein each of said plurality of wheels incorporates a large aggressive tread.

15. The caddy of claim 10, wherein said handle assembly further comprises:

a pair of handle posts, each having a first end affixed to said frame base;

a rear handle attached to and spanning a distance between a second end of each said pair of handle posts;

a bottle opener affixed to one of said pair of handle posts;

at least one hook affixed to a support bar between said pair of handle posts; and, at least one container holder affixed to said rear handle;

wherein said rear handle further incorporates said releasing means.

16. The caddy of claim 15, further comprising at least two shelf assemblies, each pivotally attached between said handle posts.

17. The caddy of claim 16, wherein each shelf assembly further comprises a plurality of clips disposed thereon.

18. The caddy of claim 17, further comprising at least one mesh bag with a securable opening, each affixed to an individual shelf assembly.

19. The caddy of claim 10, wherein each auxiliary mounting device comprises:

a mounting rail capable of being attached to said frame base;

an outer channel slidably disposed over said mounting rail;

a spring fastener securing said outer channel to said mounting rail;

a holding peripheral affixed to said outer channel;

wherein said holding peripheral is configured to retain an item therein.

* * * * *